INVENTOR
John Votypka.
BY Dike, Calver & Gray
ATTORNEYS.

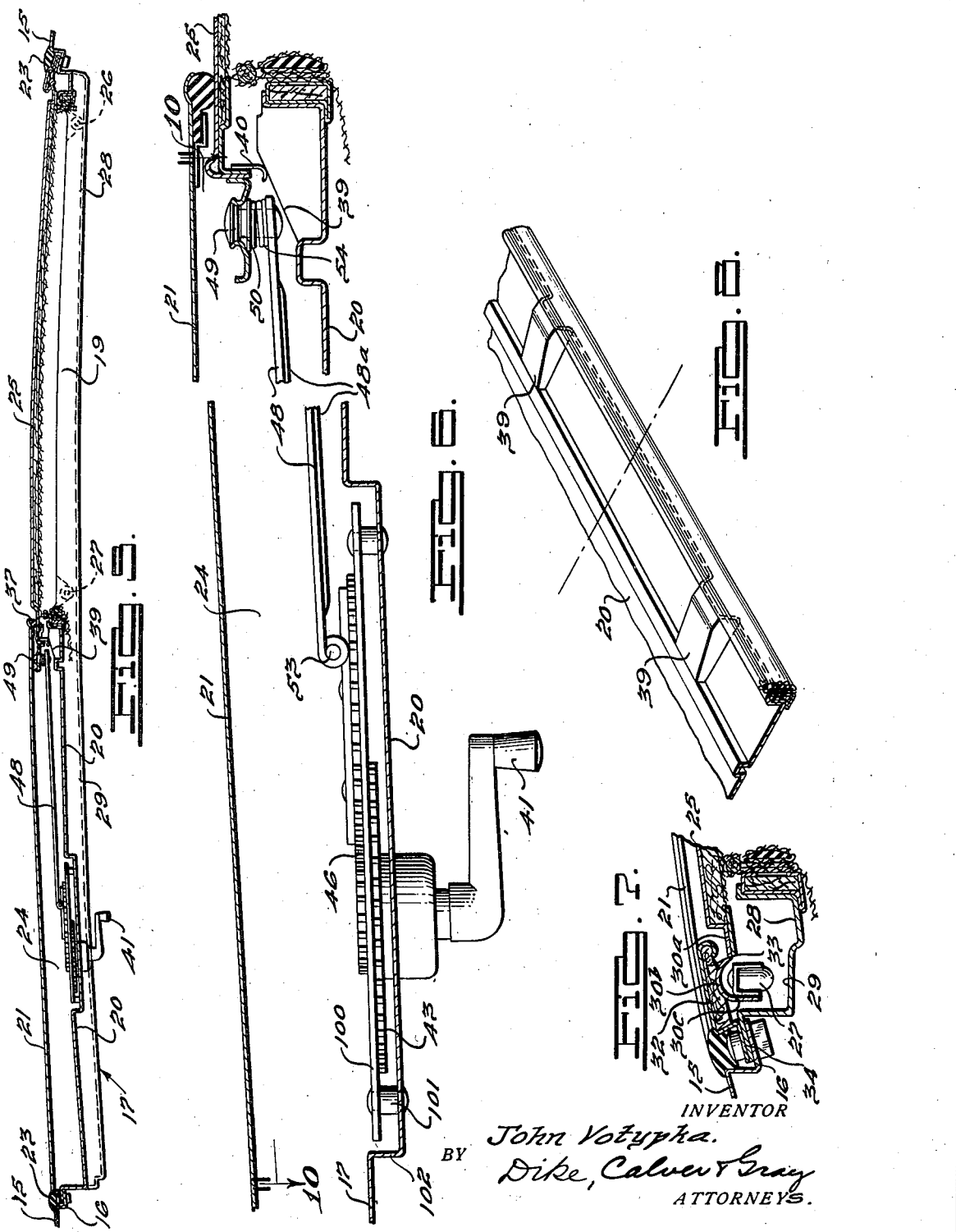

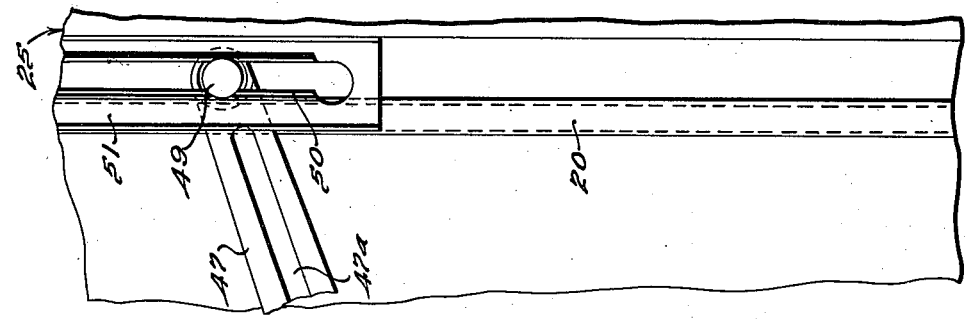
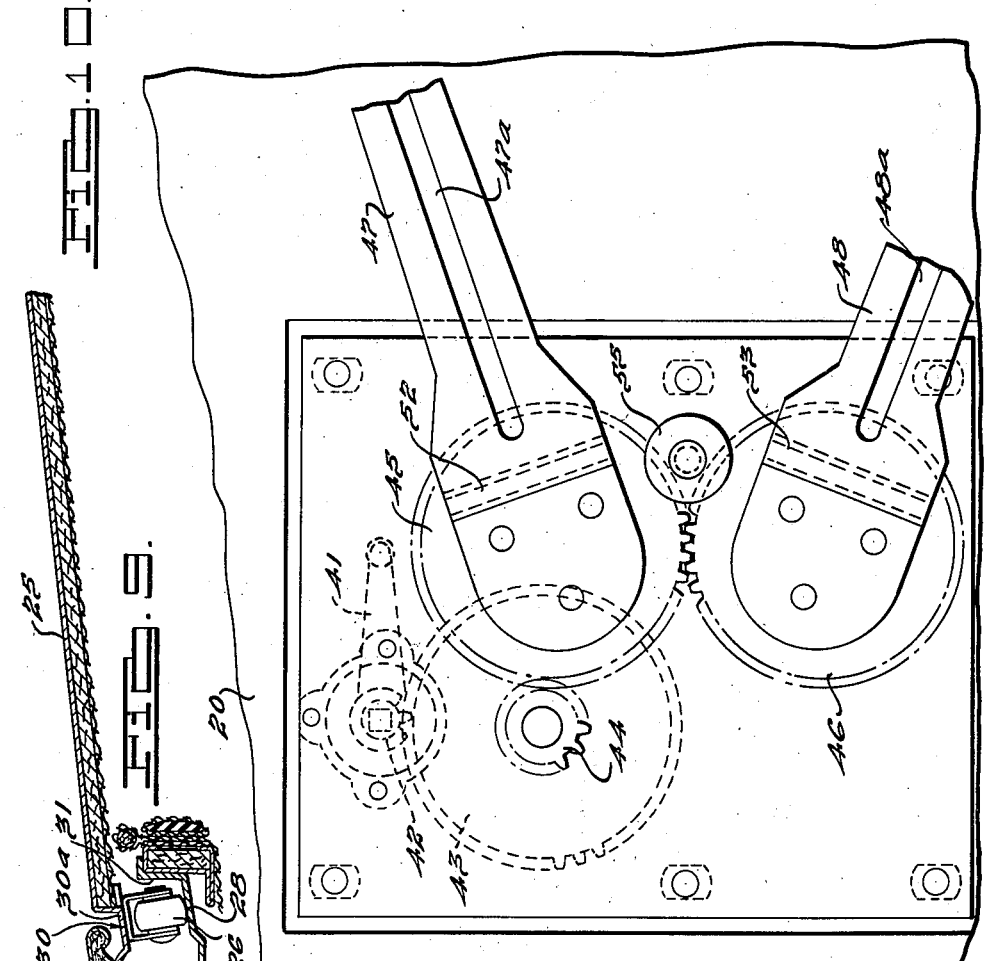

Patented Feb. 10, 1942

2,272,535

UNITED STATES PATENT OFFICE 2,272,535

VEHICLE BODY

John Votypka, Detroit, Mich., assignor to Briggs Manufacturing Company, Detroit, Mich., a corporation of Michigan Application April 26, 1937, Serial No. 138,943

8 Claims. (Cl. 296—137)

This invention relates to vehicle bodies and more particularly, although not exclusively, to closed automobile bodies of the type having an opening in the roof thereof controlled by means of a movable roof panel. The present application is a continuation-in-part of my co-pending application Serial No. 137,728, filed April 19, 1937.

One of the objects of the present invention is to provide a closed vehicle body having a roof with an opening therein and a longitudinally movable or adjustable roof panel supported, guided and controlled in an improved manner, whereby it is possible to attain in a closed vehicle body many advantages heretofore attainable only in bodies of the open type.

Another object of the invention is to provide a vehicle body of the foregoing character, in which means are provided enabling the occupants to enjoy in winter as well as in summer or during rainy weather advantages afforded by automobile bodies of the open type.

Still another object of the invention is to provide an improved automobile body having a roof curved both longitudinally and transversely of the vehicle, and a movable panel for selectively closing the roof opening, which panel is substantially straight longitudinally of the vehicle, means being provided to close the clearance space or opening which is formed between the roof and the movable panel.

A further object of the invention is to provide a vehicle body having a movable roof panel, in which body improved means are provided to seal said panel against draft and water leakage.

A still further object of the invention is to provide improved means for moving the roof panel into and out of the closed position, such means being particularly, although not exclusively, adapted for application to vehicles of the taxicab type where it is often desirable to operate the sliding roof panel from the driver's seat.

An additional object of the invention is to provide an improved vehicle body of the character specified, which is relatively simple in construction and dependable in operation, and which is relatively cheap to manufacture and service.

Other objects and advantages of this invention will appear in the following description and appended claims, reference being had to the accompanying drawings forming a part of this specification, wherein one embodiment of the present invention is illustrated.

Fig. 5 is a longitudinal sectional view taken on the line 5—5 of Fig. 1, looking in the direction of the arrows, and illustrating the respective positions of the parts of the structure when the movable panel is in its fully closed position.

Fig. 6 shows in section and on a larger scale the panel moving mechanism.

Fig. 7 is a fragmentary sectional view taken on the line 7—7 of Fig. 1, looking in the direction of the arrows, said view illustrating the roller means provided along the sides of the movable panel.

Fig. 8 is a fragmentary perspective view, partly in section, showing the cams of the cam-and-follower means provided for the purpose of bringing the front edge of the movable panel into sealing contact with the rear edge of the fixed panel.

Fig. 9 is a view similar in part to Fig. 7 and showing the inner roller in contact with its respective track.

Fig. 10 is a fragmentary plan view of the regulator mechanism.

Figure 1:
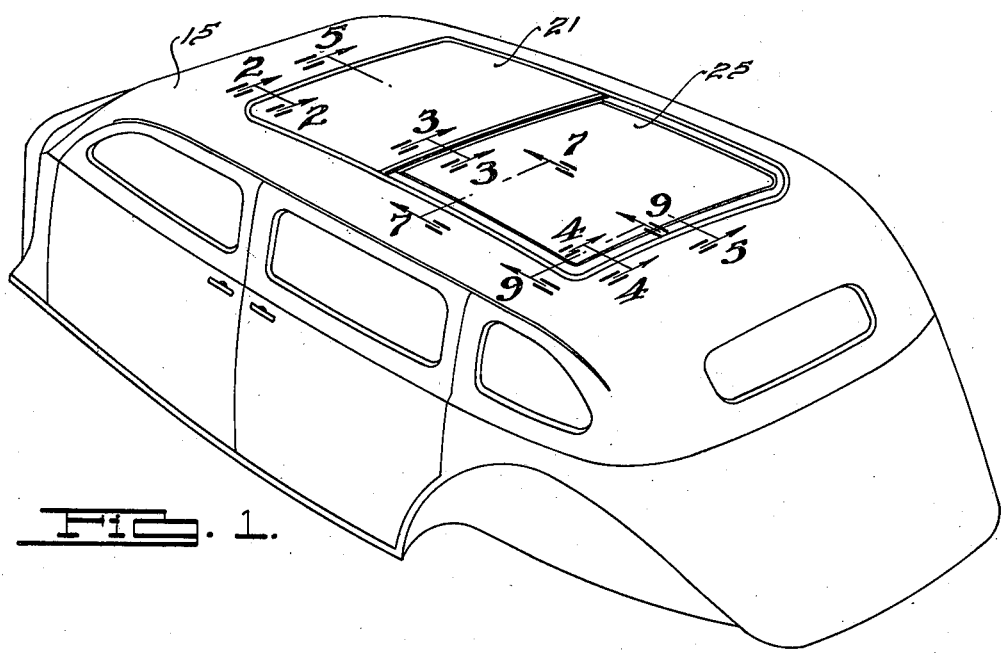
Fig. 1 is a perspective view of a vehicle body embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated certain preferred embodiments of the invention as applied to an automobile body of the cab type having a metal roof and an opening therein controlled by a panel movable toward the front of the vehicle for uncovering the opening located at the rear of the vehicle body. It will be understood, however, that the body may be constructed so that the movable panel will control an opening located at the front portion of the roof.

Referring to the drawings and particularly to Fig. 1, there is shown a vehicle body having a roof suitably supported by the body frame structure (not shown), the cover or upper sheet 15 forming the outside surfaces of said roof merging smoothly and seamlessly with the panels or sheets forming the side, the front and the rear panels of the body.

The roof upper sheet 15 is provided with a generally rectangular main opening extending substantially throughout the entire length of the roof upper sheet. The edges of said roof 15 around said opening are pressed downward to provide shoulder flanges 16. Within said roof opening there is arranged a pan-like panel or sub-panel 17 adapted to rest with its outwardly directed flanges 18 upon the shoulder flanges 16 of the roof. In the rear portion or half of the bottom of said sub-panel 17 there is provided a generally rectangular skylight opening or aperture, which opening is surrounded on the three sides thereof by the narrow flanges formed by said bottom, while on its fourth side said bottom forms a wide closed portion 20 closing, for example, about one-half of the main roof opening.

Figures 2, 4:
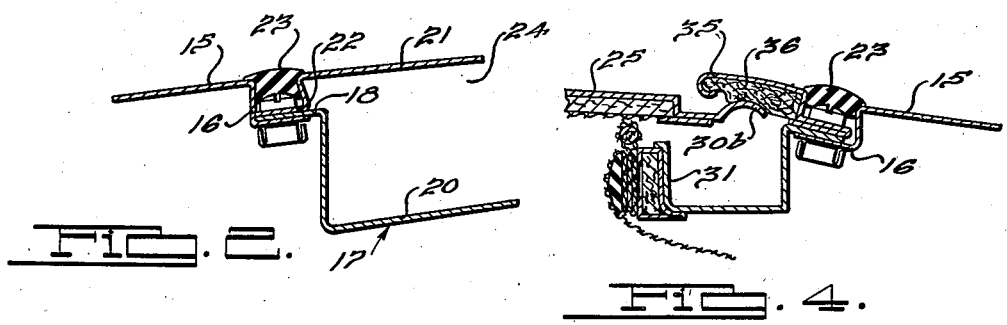
Fig. 2 is a fragmentary sectional view taken on the line 2—2 of Fig. 1, looking in the direction of the arrows.
Fig. 4 is a fragmentary sectional view taken on the line 4—4 of Fig. 1, looking in the direction of the arrows.

Within the main roof opening and above said closed portion 20 there is provided an upper fixed panel 21 arranged substantially flush with the roof upper sheet 15 and resting with its angle flanges 22 upon the flanges 18 of the sub-panel 17, see Fig. 2. A rubber strip 23 is provided between the panel 21 and the roof 15 for the purpose of covering the trough or channel formed along the juncture of the flanges 22, 18 and 16, which flanges are connected together in any suitable manner such as by means of spot welding, rivets, bolts or the like. As can be clearly seen from an examination of the drawings, the upper fixed metal panel 21 forms, in effect, a structural continuation of the roof upper metal sheet 15, forming together with said sheet an upper sheet structure. The fixed panel 21 of the roof covers the front half of the main roof opening provided in the sheet 15, leaving the rear half of said opening uncovered, in consequence whereof there is thus provided an opening in said upper sheet structure, which opening substantially registers with the opening provided in said sub-panel 17. Said registering openings form in effect a skylight aperture 19 passing through the entire double wall roof structure. By virtue of the above described construction a pocket 24 is formed in the front part of the roof opening between the fixed upper panel 21 and the closed portion 20 of the sub-panel 17, into which pocket a panel 25 may be moved to open the skylight aperture 19.

The sliding roof panel 25 is made preferably of stamped metal and is properly trimmed from the inside to suit the appearance of the interior of the body, while its outside surface is lacquered or otherwise finished to match the exterior thereof. For the purpose of facilitating the closing and opening movements of the panel 25, there are provided roller means, which in the present embodiment of the invention are exemplified by a pair of longitudinally spaced rollers 26 and 27 at each side edge of the sliding panel cooperating with two parallel tracks 28 and 29 at each longitudinal side edge of the sub-panel. Said rollers 26 and 27 are carried by the panel 25 and are affixed thereto at flanges 30. The flanges 30 along opposite side edges of the sliding panel are each formed by pressing the edge of the metal sheet along its side to provide a depressed flat portion 30a to which the roller 26 is affixed, a rounded bead 30b, and a downwardly directed edge flange portion 30c to which roller 27 is secured. The tracks 28 and 29 are formed on the bottom of the sub-panel 17, the track 28 being arranged inwardly of the track 29. By virtue of this construction the rollers 26 and 27 on each of the sides of the panel are arranged in staggered relation and, therefore, the front and the rear edges of said sliding panel 25 do not reach the same elevation in passing through certain points of their longitudinal path. Along the opposite longitudinal sides of the skylight aperture 19 there are provided upstanding flanges 31 merging into the inner tracks 28, whereby the bottom portions of the sub-panel 17 form along the sides of the skylight aperture 19 channels or gutters serving to collect and drain off any rain water which may leak past the panel 25.

Figure 3:
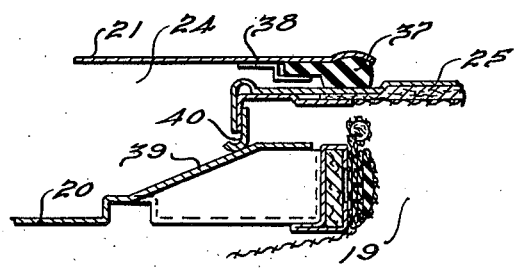
Fig. 3 is a fragmentary sectional view taken on the line 3—3 of Fig. 1, looking in the direction of the arrows.

For the purpose of sealing the movable panel 25, when the same is in its fully closed position, against draft and water leakage, means are provided effecting such sealing along the sides, the rear edge and the front edge of said panel 25. Sealing of the panel 25 along the longitudinal sides thereof is effected with the aid of overhanging metal retainer strips 32 each supporting a waterproofed felt strip 33 bearing upon and yieldingly engaged under pressure by the rounded bead 30b of the flange 30. The strips 32 are pressed downward to provide offset flanges 34 secured to the flanges 18 and 16 as shown in Fig. 7. With this construction it will be seen that the overhanging retainer members 32 extend flush with the fixed roof panel 21. A substantially similar overhanging metal strip 35 supporting a waterproofed felt strip 36 is provided along the rear edge of the skylight aperture 19. Thus, when the sliding roof panel is closed the upstanding bead 30b along its rear edge will be pressed against the sealing material 36 to effect a tight seal. Along the rear edge of the upper fixed panel 21 there is provided a resilient rubber sealing strip 37 suitably held therealong, such as by means of a metal retainer strip 38. Means are provided to bring the front edge of the panel 25 into tight sealing contact with said strip 37, see Fig. 3, thereby providing a water tight joint. In the present embodiment of the invention said means comprise two upstanding ramps or cam portions 39 integrally formed as by stamping, on the rear edge of the portion 20 as shown in Fig. 8, and followers 40 carried by the sliding panel 25. As the moving panel 25 reaches, in closing the skylight aperture 19, the end of its rearward movement, said followers 40 ride up upon the cam portions 39 thereby raising the front edge of said movable panel 25 and pressing the same into tight sealing contact with said strip 37. A conventional windlace is provided at all four sides of the skylight aperture 19, the headlining being secured under said windlace to a tacking strip in conventional manner. It will now be understood in view of the foregoing that when the panel 25 is in its fully closed position it is securely sealed around all four sides against leakage and draft as well as against the possibility of rattling.

Means for moving the panel 25 into and out of the pocket 24 are exemplified by an improved regulator mechanism mounted on the portion 20 of the sub-panel 17. This mechanism includes a mounting plate 100 secured by spacer rivets 101 to a countersunk portion 102 pressed into the sub-panel 17. The regulator also comprises a rotatable handle 41 journaled in the mounting plate and arranged within convenient reach of the driver of the vehicle. This handle carries a small gear or pinion 42 engaging a larger gear 43 mounted on the same shaft with a second small gear 44. The latter meshes with a large gear 45. The gear 45 meshes with a gear 46 which has the same diameter. To said gears 45 and 46 are riveted or otherwise secured the inner ends of two similar arms 47 and 48. Secured to the opposite or outer end of each arm is a stud or finger 49. The finger 49 is slidable within a slot 50 provided in a metal retainer strip 51 spot welded or otherwise secured to the front edge of the panel 25. A similar strip (not shown) is provided for the arm 48. The strips 51 are located equidistant from the longitudinal center line of the body. Rotation of the handle 41 operates to rotate the meshing gears 45 and 46, thereby rotating or swinging the arms 47 and 48 around the centers of the gears 45 and 46 and increasing or decreasing the angle formed by said arms. As the angle formed by said arms increases, the headed studs 49 carried by said arms operate to exert a pulling force on the metal strip 51 and to draw the panel 25 into the pocket 24. Rotation of the handle 41 in the opposite direction will produce a decrease of the angle between said arms, in consequence whereof, the movable panel 25 will be drawn out of said pocket 24 toward its closed position. The arms 47 and 48 may be stamped out of sheet metal and provided with stiffening beads 47a and 48a as shown. These arms are preferably located so as to be at equal distances from the longitudinal center line of the sliding roof panel and at opposite sides thereof.

In order to permit the stud carrying extremities of the arms 47 and 48 to move upward in following the upward movement of the front edge of the panel 25 on the ramps 39 without disengaging the gears 45 and 46, hinges 52 and 53 are provided in said arms 47 and 48 respectively. A spring 54 is provided for the same purpose on the shank of each stud 49 and is interposed between the head of the stud and the arm. A disk 55 bearing upon the gears 45 and 46 maintains them in mesh against disengagement.

It is to be noted that the regulator mechanism is irreversible, and because of the irreversibility thereof, the panel 25 is automatically locked in its fully open and fully closed positions, as well as in any intermediate position between them, thus preventing undesirable movements of the panel upon the sudden application of brakes, or when the vehicle is accelerating.

Thus in one of its broader aspects the invention contemplates providing a vehicle body having a double-wall roof with two registering openings therein, the upper wall of said roof being of a built-up construction, the upper fixed panel being regarded as a portion of the upper wall, and a panel slidable within the space formed by said walls, said slidable panel being supported by the lower wall or sub-panel, and adapted to come in its closed position in sealing contact with the edges of the upper wall around the opening thereof, tightly closing same and also covering the opening in the lower wall or sub-panel of the roof.

I claim:

1. In a vehicle body, a roof comprising an upper sheet structure, a sheet metal sub-panel provided under said upper sheet structure to form a double wall roof, said sub-panel being adapted to collect leaking water, the upper sheet structure and the sub-panel being provided with two registering openings occupying substantially not more than one-half of the total area of said sub-panel, and an upstanding flange around all sides of the opening in said sub-panel preventing the water which may be collected in said sub-panel from entering the interior of the body.

2. In a vehicle body, a roof comprising an upper sheet structure, a sheet metal sub-panel provided under said upper sheet structure to form a double wall roof, said sub-panel being adapted to collect leaking water, the upper sheet structure and the sub-panel being provided with two registering openings occupying substantially not over one-half of the sub-panel area, an upstanding flange around all sides of the opening in said sub-panel preventing the water which may be collected in said sub-panel from entering the interior of the body, a panel movable within the space formed by said upper sheet structure and said sub-panel, said movable panel being supported by said lower wall and adapted to come in its closed position in sealing contact with the edges of said upper sheet structure around the opening provided therein and to close said opening, covering at the same time the registering opening provided in said sub-panel.

3. In a vehicle body, a roof comprising an upper sheet structure, a sheet metal sub-panel provided under said upper sheet structure to form a double wall roof and supported solely by said sheet, the upper sheet structure and the sub-panel being provided with two registering openings and forming a pocket adjacent said openings, parallel tracks formed on the bottom of said sub-panel, a panel movable into and out of said pocket to open and to cover selectively the opening in said sub-panel, a plurality of rollers carried by said movable panel and cooperating with said tracks for supporting said movable panel, a flange provided at the edges of the opening in said upper sheet structure, said flange being substantially flush with said upper sheet structure and overhanging said movable panel to hold the same down against said tracks.

4. In a vehicle body, a roof comprising an upper sheet structure, a sheet metal sub-panel provided under said upper sheet structure to form a double wall roof and supported solely by said sheet, the upper sheet structure and the sub-panel being provided with two registering openings and forming a pocket adjacent said openings, parallel tracks formed on the bottom of said sub-panel, a panel movable into and out of said pocket to open and to cover selectively the opening in said sub-panel, a plurality of rollers carried by said movable panel and cooperating with said tracks for supporting said movable panel, a flange secured to the edges of said upper sheet structure along the three sides of the opening provided therein, said flange adapted to overhang said movable panel and to hold the same down resiliently against said tracks.

5. In a vehicle body, a roof comprising an upper sheet structure, a sheet metal sub-panel provided under said upper sheet structure to form a double wall roof and supported solely by said sheet, the upper sheet and the sub-panel being provided with two registering openings and forming a pocket adjacent said openings, parallel tracks formed on the bottom of said sub-panel, a panel movable into and out of said pocket to open and to cover selectively the opening in said sub-panel, a plurality of rollers carried by said movable panel and cooperating with said tracks for supporting said movable panel, a flange secured to the edges of said upper sheet structure along the three sides of the opening provided therein, said flange adapted to overhang said movable panel and to hold the same down resiliently against said tracks, a ramp portion formed on the bottom of said sub-panel adjacent said pocket, a follower carried by the movable panel and adapted to engage said ramp portion when the movable panel approaches its closed position, whereby the edge of said movable panel is brought by the closing motion of the movable panel into sealing contact with said upper panel along the fourth side thereof.

6. In a vehicle body, a roof comprising an upper sheet structure, a sheet metal sub-panel provided under said upper sheet structure to form a double wall roof and supported solely by said sheet, the upper sheet structure and the sub-panel being provided with two registering openings and forming a pocket adjacent said openings, parallel tracks formed on the bottom of said sub-panel, a panel movable into and out of said pocket to open and to cover selectively the opening in said sub-panel, a plurality of rollers carried by said movable panel and co-operating with said tracks for supporting said movable panel, a flange secured to the edges of said upper sheet structure along the three sides of the opening provided therein, said flange adapted to overhang said movable panel and to hold the same down resiliently against said tracks, a ramp portion formed on the bottom of said sub-panel adjacent said pocket, a follower carried by the movable panel and adapted to engage said ramp portion when the movable panel approaches its closed position, whereby the edge of said movable panel is brought by the closing motion of the movable panel into sealing contact with said upper sheet structure along the fourth side thereof, and an irreversible regulator mounted on said sub-panel and engaging said panel for moving the same, said regulator including an actuating handle operable from the driver's seat.

7. In a vehicle body, a roof including an upper sheet structure, a sheet metal sub-panel provided under said upper sheet structure to form a double wall roof, said sub-panel comprising a substantially rectangular metal sheet having upstanding border flanges around all its sides adapted to be secured to said upper sheet structure, said upper sheet structure and sub-panel being provided with two registering openings occupying substantially not more than one-half of the total area of said sub-panel, said openings being provided closer to one end of the sub-panel, a continuous upstanding flange on said sub-panel around all sides of the opening provided therein, whereby there is formed on said sub-panel a relatively narrow gutter around the two sides and one end thereof, and a relatively wide closed portion adjacent the other end of said opening, said portion forming together with said upper sheet structure a panel receiving pocket.

8. In a vehicle body, a roof including an upper sheet structure, a sheet metal sub-panel provided under said upper sheet structure to form a double wall roof, said sub-panel comprising a generally rectangular metal sheet having upstanding border flanges around all its sides adapted to be secured to said upper sheet structure, said upper sheet structure and sub-panel being provided adjacent one end of the sub-panel with two registering openings, a continuous upstanding flange on said sub-panel around all sides of the opening provided therein, whereby there is formed on said sub-panel a relatively narrow gutter around the two sides and one end of the opening therein, and a relatively wide closed portion adjacent the other end of said opening, said portion forming together with said upper sheet structure a panel receiving pocket.

JOHN VOTYPKA.